US005349667A

United States Patent [19]
Kaneko

[11] Patent Number: 5,349,667
[45] Date of Patent: Sep. 20, 1994

[54] INTERRUPT CONTROL SYSTEM FOR MICROPROCESSOR FOR HANDLING A PLURALITY OF MASKABLE INTERRUPT REQUESTS

[75] Inventor: Hiroaki Kaneko, Tokyo, Japan
[73] Assignee: NEC Corporation, Tokyo, Japan
[21] Appl. No.: 940,924
[22] Filed: Sep. 8, 1992
[30] Foreign Application Priority Data
Sep. 5, 1991 [JP] Japan .................. 3-225557
[51] Int. Cl.$^5$ ........................... G06F 9/46
[52] U.S. Cl. ................... 395/725; 364/280.8; 364/241.2; 364/241.6; 364/259; 364/259.2; 364/251.3; 364/DIG. 1
[58] Field of Search .......... 395/725, 325, 425, 275

[56] References Cited

U.S. PATENT DOCUMENTS

| | | | |
|---|---|---|---|
| 4,023,143 | 5/1977 | Braunstein | 364/200 |
| 4,200,912 | 4/1980 | Harrington et al. | 364/200 |
| 4,349,872 | 9/1982 | Fukasawa et al. | 364/200 |
| 4,349,873 | 9/1982 | Gunter et al. | 364/200 |
| 4,631,659 | 12/1986 | Hayn, II et al. | 364/200 |
| 4,648,029 | 3/1987 | Cooper et al. | 364/200 |
| 4,924,382 | 5/1990 | Shouda | 364/200 |
| 4,972,312 | 11/1990 | den Boef | 364/200 |

*Primary Examiner*—Gopal C. Ray
*Attorney, Agent, or Firm*—Whitham & Marhoefer

[57] ABSTRACT

A microcomputer includes a maskable interrupt request terminal, a maskable interrupt request terminal, and a nonmaskable interrupt request terminal, and internally contains a status register having a group of flags indicating a maskable interrupt allowing level, a flag indicating that a nonmaskable interrupt processing is under execution, a flag indicating that an exception processing is under execution, and a flag indicating inhibition of the maskable interrupt. There are also internally provided first and second save registers for saving the content of the status register and the content of a program counter, respectively, when the maskable interrupt request is acknowledged, and third and fourth save registers for saving the content of the status register and the content of a program counter, respectively, when the nonmaskable interrupt request is acknowledged. A register is provided to independently indicate the acknowledgement of the maskable interrupt and the acknowledgement of the nonmaskable interrupt, and a comparator compares the level designated by the maskable interrupt allowing level indicating flag group with an interrupt request level notified through the maskable interrupt request level terminal.

3 Claims, 5 Drawing Sheets

INTERRUPT CONTROL SYSTEM FOR MICROPROCESSOR FOR HANDLING A PLURALITY OF MASKABLE INTERRUPT REQUESTS

BACKGROUND OF THE INVENTION

1. Field of the Invention

The present invention relates to an interrupt controller for use in a microprocessor, which can handle a plurality of maskable interrupt requests.

2. Description of Related Art

Generally, systems using a microprocessor are provided with an interrupt controller so that, when an interrupt request is generated by a peripheral device in the course of execution of a program, the microprocessor discontinues the execution of the program being currently executed, and executes an interrupt processing program corresponding to the interrupt request generated by the peripheral device. Here, the program discontinued by the interrupt request will be called a "main program".

If a number of peripheral devices are coupled, a plurality of interrupt requests are concurrently generated, or when an interrupt program for an interrupt request of one peripheral device is being executed, another peripheral device generates an interrupt request. In order to comply with these situations, a multiple interrupt processing function is required to determine which of the concurrently generated interrupt requests should be acknowledged, and an interrupt mask function is also required for temporarily, reserving or suspending the interrupt request.

In addition, in compliance with conflict of a plurality of interrupt request signals, a priority order control is prepared to assign a different level of priority to each of the interrupt request signals, and to ensure that a processing program corresponding to an interrupt request signal having a high priority level is preferentially executed.

Furthermore, in order to execute one of the different interrupt processing programs corresponding to a plurality of interrupt requests, a mechanism can be provided to obtain a start address of each interrupt processing program. In a first case, the start address is fixed in accordance with the kind of interrupt requests, and in a second case, the start address is generated on the basis of information notified from the peripheral device (called a "vector number" hereinafter). In a third case, the functions of the first and second cases are selectively or simultaneously provided.

In addition, after execution of the interrupt processing program has been completed, it is necessary to return the control to the discontinued main program. For this purpose, there is provided a mechanism for preserving or saving information required to restart the main program (contents of register resources) after the interrupt request is acknowledged but before the control is moved to the interrupt processing program. A location where the information is preserved or saved, is in many cases in a stack of an internal or external memory section or in a register bank region.

In order to quickly perform the above mentioned various functions required for and associated with the interrupt, various microprocessors having the interrupt processing function have been proposed and reduced to practice. However, the following disadvantages have been encountered in connection with a plurality of maskable interrupt requests:

(1) External circuits including an interrupt controller have been required;

(2) Since a plurality of bus cycles are ceaselessly required, an interrupt responsiveness is low;

(3) Even in a conventional microprocessors in which the above has been improved, a multiple interrupt processing is not supported, and therefore, an interrupt responsiveness is dependent upon a program.

SUMMARY OF THE INVENTION

Accordingly, it is an object of the present invention to provide an interrupt control system for use in a microprocessor, which has overcome the above mentioned defects of the conventional one.

Another object of the present invention is to provide an interrupt control system for use in a microprocessor, capable of quickly and flexibly complying with a plurality of maskable interrupt requests, without requiring an external circuit.

The above and other objects of the present invention are achieved in accordance with the present invention by an interrupt control system for use in a microprocessor configured to sequentially execute an instruction indicated by a program counter and to be able to process a plurality of interrupt requests, the interrupt control system including a first receiving means for receiving an interrupt request from an external, a second receiving means for receiving from the external a level of the interrupt request supplied to the first receiving means, a status hold means having a group of flags indicative of an interrupt allowing level and a flag indicating effectiveness of an interrupt request, a first save means for saving a content of the status hold means, a second save means for saving a content of the program counter, a status indicating means indicating that the interrupt is acknowledged, a comparison means for comparing the interrupt allowing level indicated by the group of flags, with the level received by the second receiving means, and a control means for controlling the status hold means, the first and second save means and the status indicating means.

In a preferred embodiment, the interrupt control system further includes a third receiving means for receiving another interrupt request from an external, a third save means for saving a content of the status hold means, and a fourth save means for saving a content of a program counter, so that when an interrupt request is supplied to the third receiving means, the control means controls so as to cause the contents of the status hold means and the program counter to be saved to the third and fourth save means, respectively.

As seen from the above, the interrupt control system in accordance with the invention and for use in the microprocessor has a multiple interrupt processing function and an internal register group for saving the internal status, and is configured to generate a start address of each of a plurality interrupt processing programs corresponding to a plurality of interrupt requests.

The above and other objects, features and advantages of the present invention will be apparent from the following description of preferred embodiments of the invention with reference to the accompanying drawings.

DESCRIPTION OF THE PREFERRED EMBODIMENTS

Figure 1:
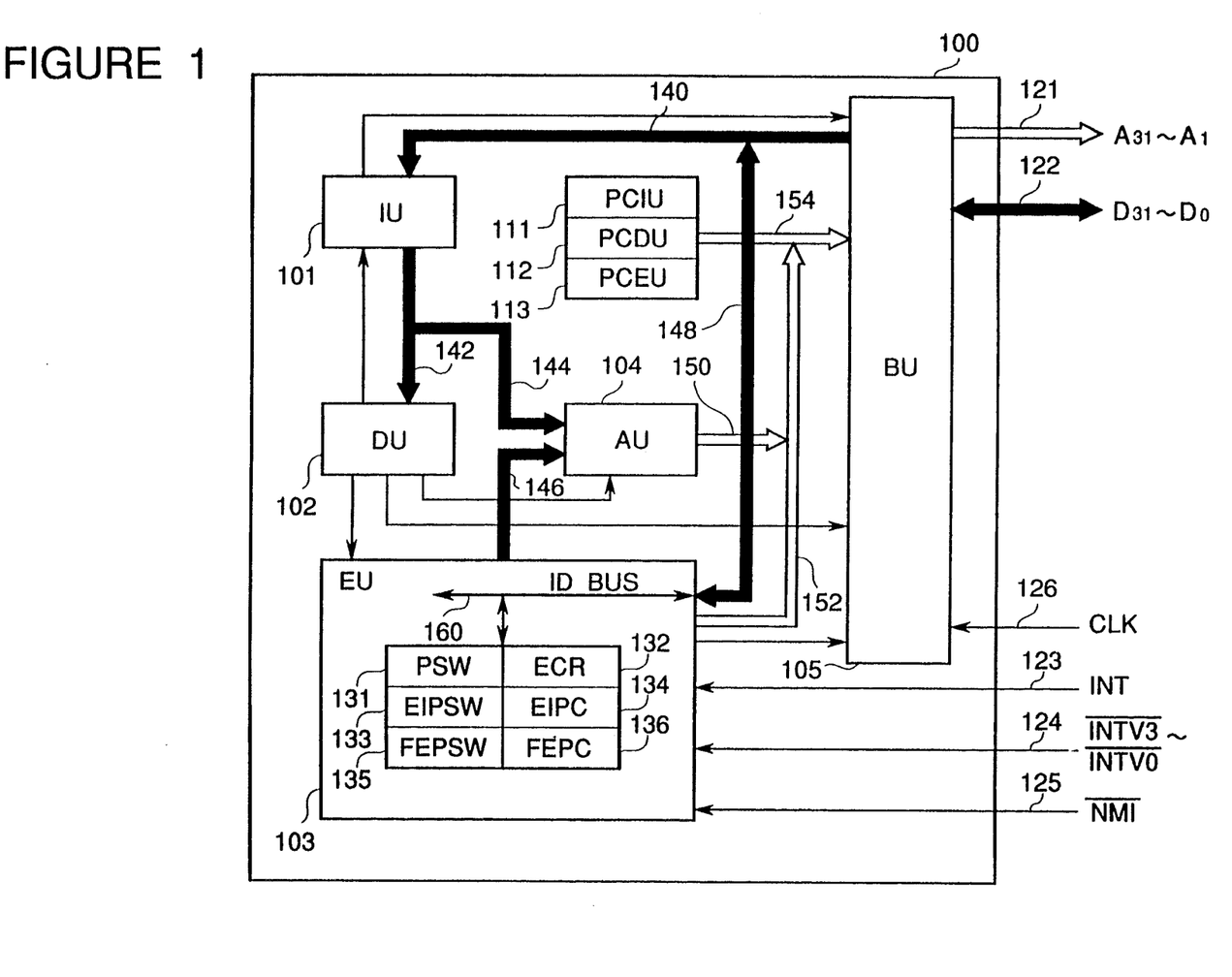
FIG. 1 is a block diagram of one embodiment of the microprocessor embodying the present invention.

Referring to FIG. 1, there is shown a block diagram of one embodiment of the microprocessor in accordance with the present invention.

In FIG. 1, a 32-bit microprocessor capable of supporting 16 kinds of maskable interrupt and a non-maskable interrupt, is generally designated by Reference Numeral 100. The shown microprocessor 100 is configured to operate in synchronism with a basic clock signal CLK supplied to a clock input terminal 126. In order to perform a pipelined operation, the shown microprocessor 100 includes an instruction fetch unit (abbreviated to "IU" hereinafter) 101, an instruction decode unit (abbreviated to "DU" hereinafter) 102, an instruction execution unit (abbreviated to "EU" hereinafter) 103, an effective address calculation unit (abbreviated to "AU" hereinafter) 104, and a bus interface unit (abbreviated to "BU" hereinafter) 105, which are coupled as shown. In addition, there are provided a program counter PCIU 111 for holding an address where an instruction being processed by the IU 101 is stored, a program counter PCDU 112 for holding an address where an instruction being processed by the DU 102 is stored, and a program counter PCEU 113 for holding an address where an instruction being processed by the EU 103 is stored.

The IU 101 is configured to control a start of a fetch cycle and to store an instruction code fetched from an external in each fetch cycle. The IU 101 can be constructed to include an instruction cache. The instruction code has either a 16-bit length or a 32-bit length. Each instruction code is located from a half-word boundary of a memory (the least significant bit of an internal address is "$0_b$" where the suffix "b" indicates a binary notation).

The DU 102 decodes the instruction code stored in the IU 101 and generates various signals inherent to each of the instructions. Typically, these signals include (1) kind of instruction execution processing, (2) kind of operandi (the number of the memory/register), (3) data type of operand, (4) recognition of a special instruction, etc. Signals generated by the DU 102 are supplied to various units as operation designation signals. However, some of these signals are omitted in the drawing for simplification of the drawing.

The EU 103 includes 32 general registers of a 32-bit width, an arithmetic logic unit ALU of a 32-bit width, a barrel shifter(s), etc., and executes an instruction designated by the DU 102. In addition, the EU 103 can include a multiplier and/or a floating point arithmetic operation unit. An internal control of the EU 103 can be realized by a hardwired logic or a microprogram.

The AU 104 calculates an address for an operand when the DU 102 detects that the given instruction includes an access to a memory or an I/O (input/output device). As one element used for an address calculation either a displacement value included in the instruction code, or a base value which is a content of a general register, is used. The former is supplied from the IU 101, and the latter is supplied from the EU 103.

The operand data is 8 bits, 16 bits or 32 bits (8/16/32-bit format). The 16-bit data is located from a half-word boundary (the least significant bit of an internal address is "$0_b$"), and the 32-bit data is located from a word boundary (the least significant bit of an internal address is "$00_b$").

The BU 105 generates a bus cycle on the basis of address information, data information, and the start request, which are supplied from other units. Of information read from the external in the bus cycle, an instruction code is supplied to the IU 101, and the operand data is supplied to the EU 103.

The units are internally coupled by a bus structure shown in FIG. 1.

The BU 105 is coupled to the IU 101 through a bus 140 in order to transfer an instruction code from the BU 105 to the IU 101. The IU 101 is coupled to the DU 103 through a bus 142 in order to transfer an instruction code from IU 101 to the DU 102. The IU 101 is also coupled to the AU 104 through a bus 144 in order to transfer an address element used for the address calculation, and the EU 103 is coupled to the AU 104 through a bus 146 in order to transfer an address element used for the address calculation. The EU 103 and the BU 105 are coupled through a bus 148 in order to bidirectionally transfer a read operand or a write operand. The AU 104 is coupled to the BU 105 through a bus 150 in order to transfer an effective address, and the EU 103 is coupled to the BU 105 through a bus 152 in order to transfer an address to be used in a bus cycle. The PCIU 111, PCDU 112 and PCEU 113 are coupled to the BU 105 through a bus 154 in order to transfer an address which is used in a bus cycle other than the operand access.

The EU 103 internally includes a data bus, IDbus, 160, which is exclusively used for a data transfer within the EU 103.

For simplification of the drawings, each of the internal buses are shown as one bus line of a 32-bit width, but is actually composed of a plurality of 32-bit buses.

The BU 105 has an address bus terminal $A_1$–$A_{31}$ 121 for outputting a 31-bit word address (address in unit of 16 bits), and a data bus terminal $D_0$–$D_{31}$ 122 for sending and receiving a 32-bit data.

In addition, the BU 105 includes a status output terminal for indicating the kind of the bus cycle (which of a memory space and an I/O space the access is directed to), a timing output terminal for indicating a start of the bus cycle, another status terminal for indicating the direction of the data transfer (read/write) in the bus cycle, and a ready input terminal for suspending the end of the bus cycle so as to extend the period of the bus cycle.

To the internal data bus 160 within the EU 103, the above mentioned register resources are coupled. In addition, to the internal data bus 160 there are coupled a program status word (abbreviated to a "PSW" hereinafter) 131 composed of a group of flags for indicating the result of the instruction execution and the status of the microprocessor itself, an exception cause register (abbreviated to a "ECR" hereinafter) 132 for holding a code of a cause when a maskable interrupt, a nonmaskable interrupt or an exception occurs, a saving register (called a "EIPSW" hereinafter) 133 for saving the content of the PSW 131 when a maskable interrupt or an exception occurs, a saving register (called a "EIPC" hereinafter) 134 for saving the content of the PCEU 113 when a maskable interrupt or an exception occurs, a saving register (called a "FEPSW" hereinafter) 135 for saving the content of the PSW 131 when a nonmaskable interrupt or a double exception (occurrence of a second exception in the course of processing a first exception) occurs, and a saving register (called a "FEPC" hereinafter) 136 for saving the content of the PCEU 113 when a nonmaskable interrupt or a double exception occurs.

Among these registers resources and the general registers, a data transfer can be made by executing a load special register (called a "ldsr" hereinafter) instruction or a store special register (called a "stsr" hereinafter) instruction.

Figure 2:
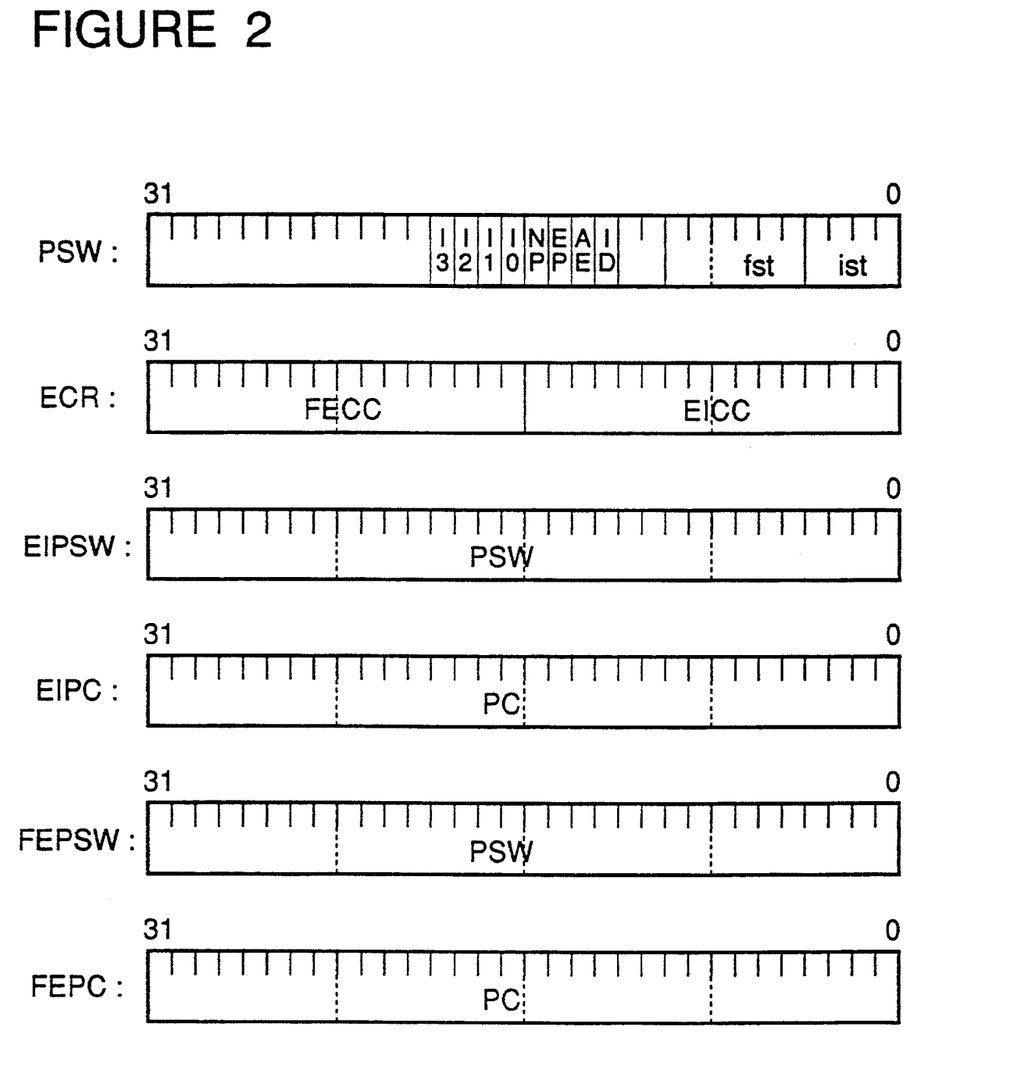
FIG. 2 is a format diagram of various registers used in the execution unit of the microprocessor shown in FIG. 1.

Referring to FIG. 2, there are shown a format on a software of each of these registers in the EU 103. The PSW 131 is broadly divided into (1) an "ist" field which is a group of flags indicating the status of the integer arithmetic operation, (2) an "fst" field which is a group of flags indicating the status of the floating point arithmetic operation, and (3) a group of flags in connection with the interrupt and exception.

Within the PSW 131, an I3/I2/I1/I0 flag shows a maskable interrupt allowing level in the form of a 4-bit code. The maskable interrupt is not allowed for an interrupt request of a level ($\overline{IR}$ level) lower than the maskable interrupt allowing level ($\overline{IE}$ level). Namely, the maskable interrupt is acknowledged only when $\overline{IR}$ level $\geq \overline{IE}$ level. If the interrupt request having the $\overline{IR}$ level is acknowledged, the whole of the PSW 131 is saved to the EIPSW 133 or the FEPSW 135, and the $\overline{IE}$ level is set to the $\overline{IR}$ level.

An NP flag of the PSW 131 shows that the nonmaskable interrupt is being processed. When the nonmaskable interrupt is acknowledged, this NP flag is set, and acknowledgement of another nonmaskable interrupt is masked.

An EP flag of the PSW 131 shows that the maskable interrupt processing or the exception processing is being executed. When the maskable interrupt is acknowledged or when the exception occurs, this AP flag is set, and acknowledgement of a further maskable interrupt is masked.

An ID flag of the PSW 131 shows that a request of the maskable interrupt is masked. When this flag is in a cleared condition, if the maskable interrupt is received, this flag is set, and acknowledgement of a further maskable interrupt is inhibited.

An AE flag of the PSW 131 has no relation to an essential operation of the present invention, and therefore, explanation will be omitted.

When the maskable interrupt is acknowledged, or when the exception occurs, an EICC field of the ECR 132 is set with a 16-bit code which indicates a cause for the maskable interrupt or the exception. In addition, when the nonmaskable interrupt is acknowledged, or when a double exception occurs (an exception occurs in the course of execution of the maskable interrupt processing or the exception processing), an FECC field of the ECR 132 is set with a 16-bit code which indicates a cause for the nonmaskable interrupt or the second exception. This 16-bit code is called an "exception code".

The microprocessor 100 can support 16 kinds of maskable interrupt and a nonmaskable interrupt, and additionally has an "exception" processing function, which detects an exceptional event occurring in the course of execution of the program and discontinues the execution of the program. A typical exception event includes (1) an "incorrect instruction code exception" in which it is attempted to execute an undefined instruction code, (2) a "zero division exception" in which it is attempted to divide by zero in a division instruction, and (3) a "floating point exception" in which an incorrect operation is performed in the floating point arithmetic operation.

If these exceptions occur, the PSW 131 and the PCEU 113 are saved similarly to when the maskable or nonmaskable interrupt is acknowledged, and the control is moved to an exception processing program (exception processing handler).

The maskable interrupt request is notified to the EU 103 from an external through an INT terminal 123 for receiving a maskable request and through INTV3, INTV2, INTV1 and INTV0 terminals 124 for receiving a 4-bit code of a maskable request level (represented by the $\overline{IR}$ level as mentioned hereinbefore) in synchronism with the maskable request. The 4-bit code can designate 16 kinds.

If the microprocessor 100 is notified of the maskable interrupt request, the microprocessor 100 acknowledges the maskable interrupt request only in the case that the ID flag of the PSW 131 is in the cleared condition (interrupt allowable condition) and the level of the maskable request is higher than the maskable request allowing level ($\overline{IE}$ level) indicated by the I3/I2/I1/I0 flag ($\overline{IR}$ level $\geq \overline{IE}$ level).

The status of the INT terminal 123 and the INTV3, INTV2, INTV1 and INTV0 terminals 124 need to be held in an active condition after the microprocessor 100 detects the maskable request until the cause is cleared in a software manner.

The nonmaskable interrupt request is notified to the EU 103 from the external by a falling down transition at an $\overline{NMI}$ terminal 125 for receiving the nonmaskable interrupt request.

If the microprocessor 100 is notified of the nonmaskable interrupt request, the microprocessor 100 acknowledges the nonmaskable interrupt request, regardless of the status of the ID flag in the PSW 131.

Furthermore, a construction and operation relating to the interrupt/exception processing of the EU 103 will be described in detail.

Figure 3:
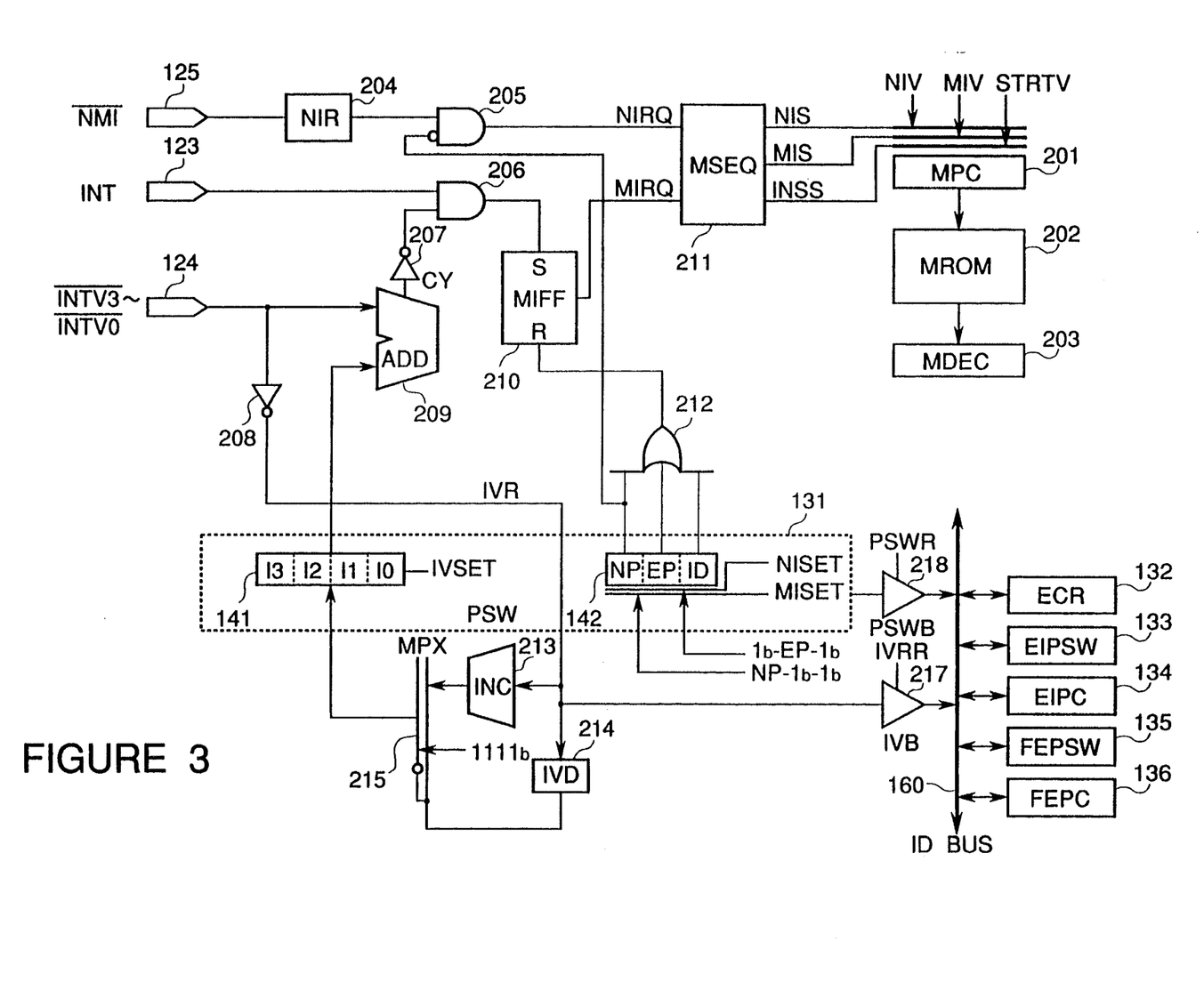
FIG. 3 is a detailed logic diagram of a portion relating to the interrupt/exception processing, in the instruction execution unit of the microprocessor shown in FIG. 1.

Referring to FIG. 3, there is shown a block diagram of the construction relating to the interrupt/exception processing of the EU 103. The EU 103 is a micromachine controlled by a microinstruction which is stored in a microprogram read only memory (abbreviated to a "MROM" hereinafter) 202 and which is designated by an address outputted from a microprogram counter (abbreviated to a "MPC" hereinafter) 201.

On the basis of the result of the decoding of the DU 102, the MPC 201 is set with a start address STRTV of a particular microprogram at the time of starting an instruction execution processing. Then, the MPC 201 is incremented for each one clock, excepting that (1) a branch field instruction is executed and a branch is performed, and (2) the waiting of the execution of the microinstruction is requested by the EU 103 and another unit and the execution of the microinstruction is temporarily stopped.

A microinstruction read from the MROM 202 is decoded by a microinstruction decoder (abbreviated to a "MDEC" hereinafter) 203, which in turn generates signals necessary for controlling the EU 103 and other units of the microprocessor 100.

A series of microinstructions from a microinstruction of a start address, where the microprogram is started, to an end microinstruction (called an "END instruction" hereinafter), is called a "microroutine". One microroutine is prepared for the processing of at least one instruction. In addition, the microroutine is used for executing the interrupt processing and the exception processing.

A microsequencer (abbreviated to a "MSEQ" hereinafter) 211 detects the execution of the END instruction and generates INSS, MIS and NIS signals for respectively setting, as the execution start address of the MPC 201, (1) STRTV determined by the result of the instruction decoding by the DU 102, (2) constant number MIV corresponding to the processing microroutine for the maskable interrupt, and (3) constant number NIV corresponding to the processing microroutine for the nonmaskable interrupt. Only one of the INSS, MIS and NIS signals is exclusively rendered active.

The MSEQ 211 receives the nonmaskable interrupt request signal NIRQ and the maskable interrupt request signal MIRQ and generates the NIS when the NIRQ signal is generated. If the NIRQ signal is not generated but the MIRQ signal is generated, the MSEQ 211 generated the MIS signal. When neither of the NIRQ signal and the MIRQ signal is generated, the MSEQ 211 generates the INSS signal. Thus, if the maskable interrupt and the nonmaskable interrupt are concurrently requested, the nonmaskable interrupt is preferentially acknowledged and processed.

The nonmaskable interrupt request notified to the $\overline{\text{NMI}}$ terminal 125 is latched by a nonmaskable interrupt request latch (abbreviated to an "NIR" hereinafter) 204 by detecting a falling down transition of the signal. The nonmaskable interrupt request latched in the NIR 204 is cleared by execution of a particular microinstruction in the microroutine for the nonmaskable interrupt processing. An output of the NIR 204 is outputted through a two-input AND gate 205 as the NIRQ signal. However, if the NP flag of the PSW 131 indicates that the nonmaskable interrupt is being processed, the output of the NIR 204 is blocked by the AND gate 205 so that the NIRQ signal is not supplied to the MSEQ 211.

The maskable interrupt request notified to the $\overline{\text{INT}}$ terminal 123 is masked by a two-input AND gate 206 and then supplied to a set input of a maskable interrupt request latch (abbreviated to an "MIFF") 210. If a reset input of the MIFF 210, the MIFF 210 is set so as to generate the MIRQ signal.

The MIFF 210 is a reset preference flipflop, and is reset through a three-input OR gate 212 if any one of the NP, EP and ID flags of the PSW 131 is set, regardless of the status of the set input of the MIFF 210. Accordingly, the MIRQ signal is rendered inactive in the course of the nonmaskable interrupt processing, in the course of the exception processing or in the condition in which the maskable interrupt is inhibited.

The other input of the two-input AND gate 206 is connected through an inverter 207 to a carry signal output CY of a 4-bit adder 209. Therefore, if the adder 209 generates a carry, the maskable request inputted to the $\overline{\text{INT}}$ terminal 123 is masked. The adder 209 adds a negative logic 4-bit interrupt request level (not $\overline{\text{IR}}$ level) inputted to the INTV3, INTV2, INTV1 and INTV0 terminals 124 and the 4-bit interrupt request allowing level (I3/I2/I1/I0=$\overline{\text{IE}}$ level) in the PSW 131, and notifies, by the carry output signal CY, which of {$\overline{\text{IR}}$ level $\geq \overline{\text{IE}}$ level} and {$\overline{\text{IR}}$ level $< \overline{\text{IE}}$ level} holds.

The carry output CY of the adder 209 is generated when {not $\overline{\text{IR}}$ level + $\overline{\text{IE}}$ level} > 15. Since {not $\overline{\text{IR}}$ level} = {$-\overline{\text{IR}}$ level $-1$}, the above equation can be converted into {$\overline{\text{IE}}$ level $-\overline{\text{IR}}$ level} > 16 (10,000$_b$). Since "16" cannot be expressed in the 4-bit output and therefore is equivalent to "0", the right side of the equation is put as "0". Therefore, the carry output signal CY is generated when $\overline{\text{IE}}$ level > $\overline{\text{IR}}$ level. Namely, in the case of $\overline{\text{IR}}$ level $\geq \overline{\text{IE}}$ level, the interrupt request signal applied to the $\overline{\text{INT}}$ terminal 123 passes through the two-input AND gate 206, and if $\overline{\text{IR}}$ level $< \overline{\text{IE}}$ level, the interrupt request signal is masked.

A 4-bit incrementer (abbreviated to a "INC" hereinafter) 213, an interrupt level detector (called a "IVD" hereinafter) 214 and a two-input 4-bit multiplexor 215, which are coupled as shown, gives a function of setting a level which is higher than the acknowledged maskable interrupt request by one level, to the 4-bit interrupt allowing level in the PSW 131. The maskable interrupt level ($\overline{\text{IR}}$ level) which is notified through the $\overline{\text{INT}}$ terminal 124 and which is converted into a positive logic signal by an inverter 208, is supplied as an IVR signal to the INC 213 and the IVD 214.

The INC 213 generates {$\overline{\text{IR}}$ level+1}, but when the $\overline{\text{IR}}$ level is at a maximum level "1111$_b$", if it is incremented by "1", the $\overline{\text{IR}}$ level of a minimum level "0000$_b$" is generated. In order to avoid this problem, the IVD detects whether or not the $\overline{\text{IR}}$ level is at a maximum level "1111$_b$", and if so, the IVD 214 controls the MPX 215 so as to cause the MPX 215 to fixedly output the maximum level "1111$_b$". If the $\overline{\text{IR}}$ level is not at a maximum level "1111$_b$", the IVD 214 controls the MPX 215 so as to cause the MPX 215 to output the result of increment of the INC 213.

The interrupt allowing level newly generated by the MPX is set to the I3/I2/I1/I0 flag 141 of the PSW 131 in response to a strobe signal IVSET, which is generated by execution of a particular microinstruction.

In addition, the value of the $\overline{\text{IR}}$ level is supplied through a read buffer (called a "IVB" hereinafter) 217 to the $\overline{\text{ID}}$ bus 160 in response to a read signal IVRR. The IVB 217 is connected to the $\overline{\text{ID}}$ bus 160 at a position starting from "bit 4", and therefore, if the $\overline{\text{IR}}$ level is "n", "000000n0$_h$" is obtained from the $\overline{\text{ID}}$ bus 160 as a 32-bit data, where the suffix "h" means a hexadecimal notation. The read signal IVRR is generated by execution of a particular microinstruction for reading the $\overline{\text{IR}}$ level.

The NP, EP and ID flags 142 in the PSW 131 can be updated, simultaneously in the three bits, by generation of an NISET signal or an MISET signal. If the NISET signal is generated, (1) the NP flag is set to "1$_b$" so as to indicate that the nonmaskable interrupt processing is under execution, (2) the EP flag resets its just preceding value and holds the current value, and (3) the ID flag is set to "1$_b$" so as to inhibit the maskable interrupt. The NISET signal is generated by execution of a particular microinstruction in a microroutine for the nonmaskable interrupt processing.

On the other hand, if the MISET signal is generated, (1) the NP flag resets its just preceding value and holds the current value, (2) the EP flag is set to "1$_b$" so as to indicate that the maskable interrupt processing is under execution, and (3) the ID flag is set to "$1_b$" so as to inhibit the maskable interrupt. The MISET signal is generated by execution of a particular microinstruction in a microroutine for the maskable interrupt processing.

The 32-bit value of the PSW 131 is supplied to the $\overline{\text{ID}}$ bus 160 through a read buffer (called a "PSWB" hereinafter) 218 in response to a PSWR signal, which is generated by execution of a particular microinstruction for reading the PSW 131.

Now, the interrupt processing microroutine stored in the MROM 202 will be described.

As mentioned hereinbefore, if the MSEQ 211 detects generation of the maskable interrupt, a microroutine having the constant number MIV as the starting address is started. This microroutine is called a "maskable interrupt processing routine".

In the maskable interrupt processing routine, control signals for each part within the EU 103 and for other units are generated to cause them to perform the following processings:

(1) The units other than the EU 103 are instructed not to perform their succeeding instruction processing.

(2) The content of the PSW 131 is transferred through the $\overline{\text{ID}}$ bus 160 to the EIPSW 133.

(3) The IVSET signal and the MISET signal are generated so as to update the I3/I2/I1/I0 flag 141 and the NP/EP/ID flags 142.

(4) It waits until it is confirmed that operation of the other units in response to the above (1) instruction has been stopped and the value of the PCEU 113 has become fixed.

(5) The acknowledged interrupt request level IVR (4-bit value "n") is transferred through the $\overline{\text{ID}}$ bus 160 and "000000n$0_h$" is obtained. A logical sum of "000000n$0_h$" and the constant number "FFFFFE$00_h$" is sought, and "FEn$0_h$" is transferred as the exception code to the EICC field composed of the least significant 16 bits of the ECR 132.

(6) The content of the PCEU 131 is transferred through the $\overline{\text{ID}}$ bus 160 to the EIPC 134.

(7) The value "FFFFFEn$0_h$" of the logical sum obtained in the above processing (5) is transferred through the $\overline{\text{ID}}$ bus 160 simultaneously to the PCIU 131, the PCDU 132 and the PCEU 133.

(8) The other units are instructed to restart their operation. The other units perform an operation similarly to an operation performed when a branch instruction to the address "FFFFFEn0" has been executed.

It is well known that the microinstructions stored in the MROM 202 is constituted of a plurality of independent fields so that a plurality of operations of the above mentioned operations can be simultaneously instructed. Therefore, the eight processings of the above items (1) to (8) can be executed with a smaller number of clocks (not greater than 8 clocks).

Similarly, if the MSEQ 211 detects generation of the nonmaskable interrupt, a microroutine having the constant number NIV as the starting address is started. This microroutine is called a "nonmaskable interrupt processing routine". In the nonmaskable interrupt processing routine, control signals for each part within the EU 103 and for other units are generated to cause them to perform the following processings:

(1) The units other than the EU 103 are instructed not to perform their succeeding instruction processing.

(2) The content of the PSW 131 is transferred through the $\overline{\text{ID}}$ bus 160 to the FEPSW 135.

(3) The NISET signal is generated so as to update the NP/EP/ID flags 142. In addition, the nonmaskable interrupt request held in the NIR 204 is cleared.

(4) It waits until it has been confirmed that the other units in response to the above (1) instruction stopped their operation and the value of the PCEU 113 has become fixed.

(5) The constant number "FFFFFFD$0_h$" is generated, and "FFD$0_h$" is transferred as the exception code to the FECC field composed of the most significant 16 bits of the ECR 132.

(6) The content of the PCEU 131 is transferred through the $\overline{\text{ID}}$ bus 160 to the FEPC 136.

(7) The constant number "FFFFFFD$0_h$" obtained in the above processing (5) is transferred through the $\overline{\text{ID}}$ bus 160 simultaneously to the PCIU 131, the PCDU 132 and the PCEU 133.

(8) The other units are instructed to restart their operation. The other units perform an operation similarly to an operation performed when a branch instruction to the address "FFFFFFD0" has been executed.

Figure 4:
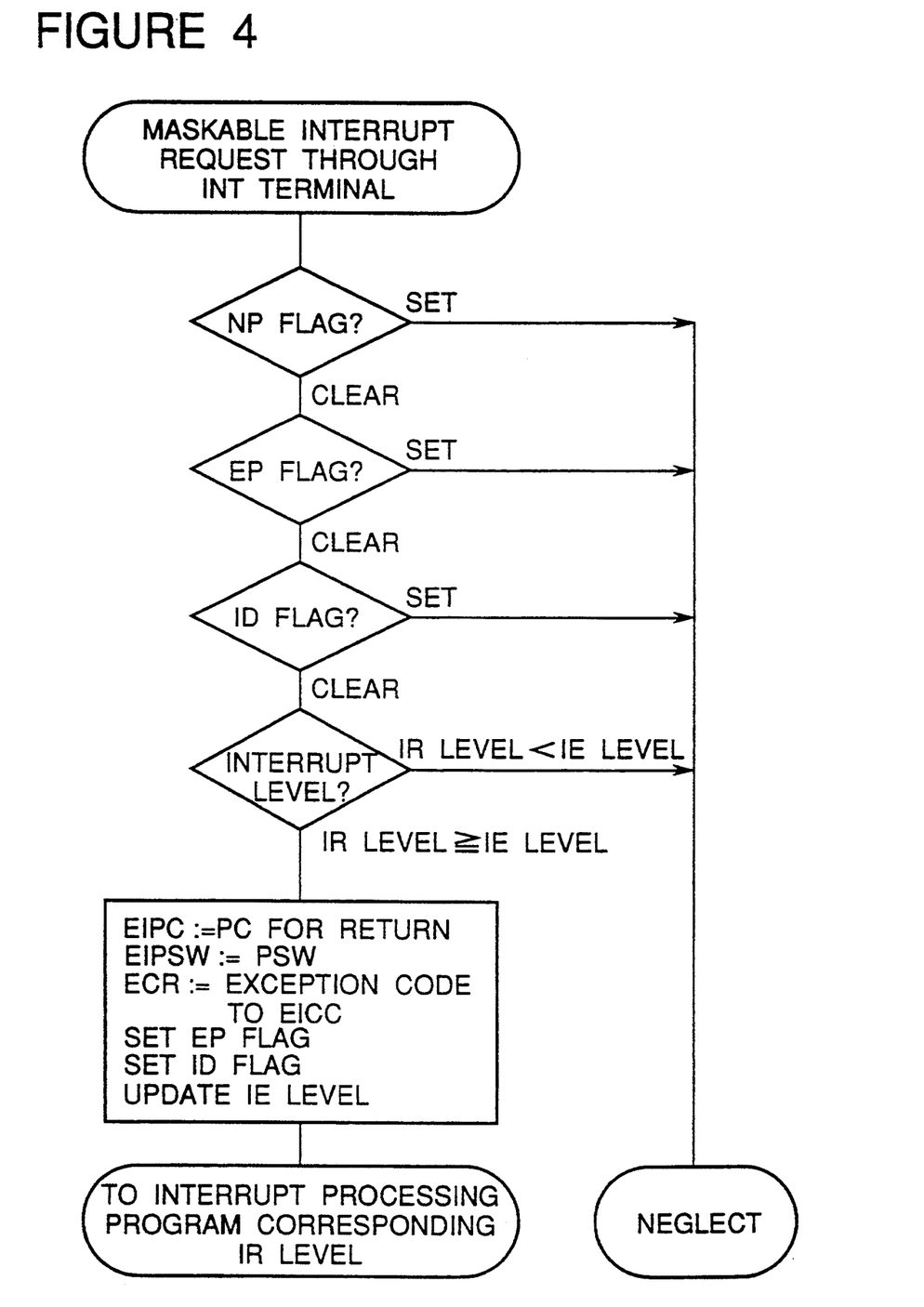
FIGS. 4 and 5 show flow charts illustrating the maskable interrupt processing and the nonmaskable interrupt processing in the present invention.
Figure 5:
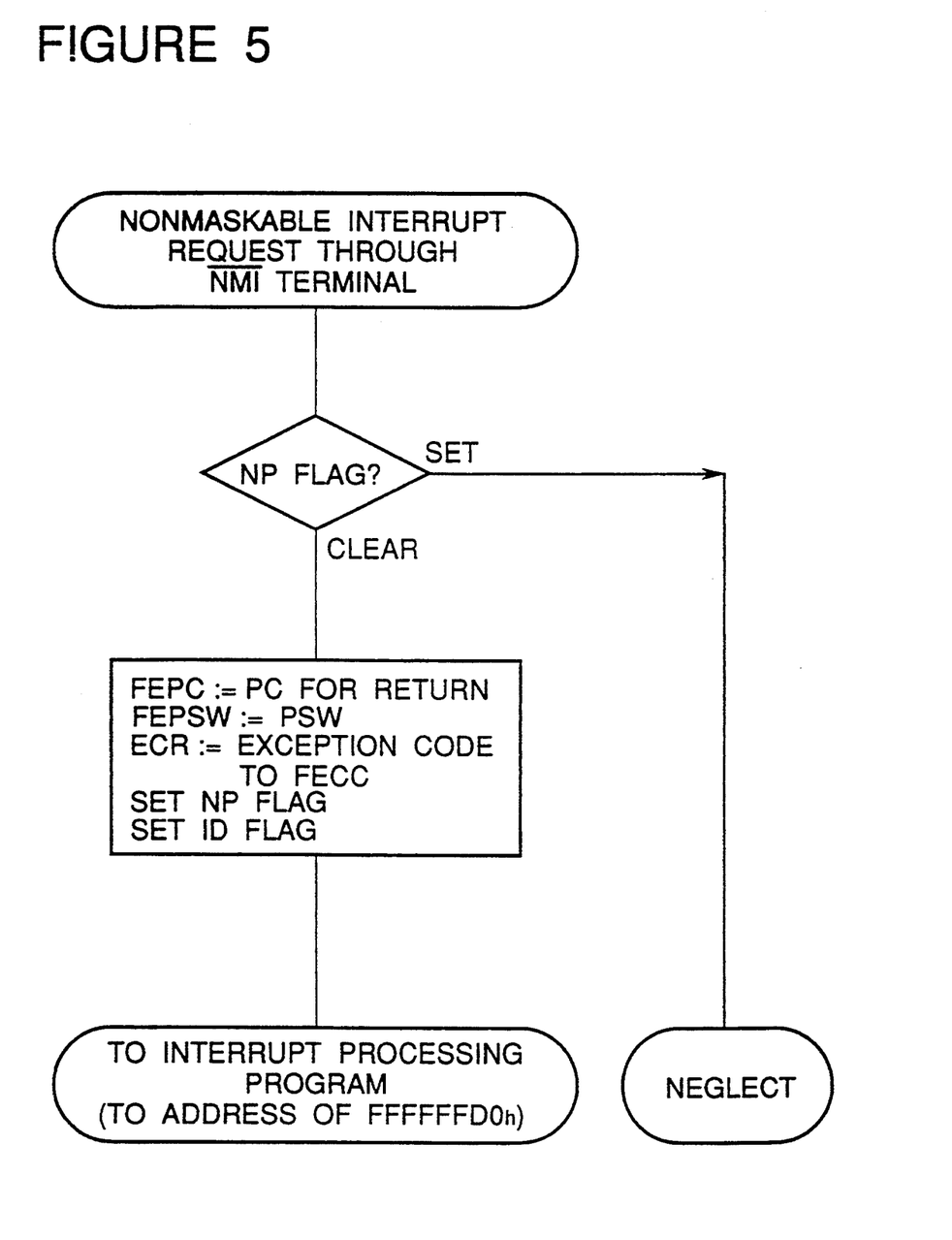

The above mentioned processing procedures of the EU 103 for the maskable interrupt and the nonmaskable interrupt are illustrated in the flowchart of FIGS. 4 and 5.

Now, the interrupt processing of the shown embodiment will be specifically described.

If the microprocessor 100 is reset, the I3/I2/I1/I0 flag and the NP, EP and ID flags of the PSW 131 are initialized to "$0000_b$" and "$1_b$", "$0_b$" and "$0_b$", respectively. By setting the NP flag to "$1_b$", the resetting is treated as an execution processing having a high priority level similar to the nonmaskable interrupt. In this condition, as seen from FIG. 4, any maskable interrupt request is neglected.

Just before completion of the resetting operation, a necessary interrupt allowing level is set to the I3/I2/I1/I0 flag and the NP flag is cleared. When it is desired not to acknowledge a maskable interrupt of any level, the resetting operation is completed after the ID flag is set.

Here, assume that all 16 kinds of interrupt requests correspond to interrupt requests from external peripheral devices, and the I3/I2/I1/I0 flag is set to "$1000_b$". After the resetting operation, the microprocessor 100 continues to execute the main program while neglecting an interrupt request of the level 7 ("$0111_b$") or less. If an interrupt request of the level 8 ("$1000_b$") or more is generated, the microprocessor 100 acknowledges the interrupt request, and discontinues the execution of the main program.

Here, assume that an interrupt request of the level 10 ("$1010_b$") is generated. As shown in FIG. 4, the following series of operations are sequentially performed: (1) the value of the PCEU 113 is saved to EIPC 134 for the restart of the discontinued main program; (2) the value of the PSW 131 is saved to the EIPSW 133; (3) "FEA$0_h$" is set to the EICC field of the ECR 132; (4) the EP flag is set to indicate that the maskable interrupt processing is under execution; (5) the ID flag is set to prevent acknowledgement of a further maskable interrupt request (multiple interrupt processing); (6) the I3/I2/I1/I0 flag is updated to the level 11 ("$1011_b$") to prevent acknowledgement of a lower level maskable interrupt request; and (7) the operation is branched to an address "FFFFFEA$0_h$" in order to execute an inherent interrupt processing program corresponding to the maskable interrupt request of the level 10 (called an "int proc 10" hereinafter).

In the interrupt processing program "int proc 10", since the EP and ID flags are set, even if a maskable interrupt request of the level 11 or more is generated, it is neglected. However, if a processing having a high level of emergency is required, the EP and ID flags are cleared. In addition, if a multiple interrupt processing is required for only a maskable interrupt request of a particular level or more (for example, in the case that maskable interrupt requests of the level 11 or less are sequentially processed one by one, but maskable interrupt requests of the level 12 or more can be processed in a multiple interrupt processing), it can be considered to reset the I3/I2/I1/I0 flag by a value larger than the automatically set value.

In the case of performing the multiple interrupt processing, it is necessary to save the contents of the EIPSW 133 and EIPC 134 to the general register or an external memory, so that the contents of these registers are protected from being broken by acknowledgement of a higher level interrupt request.

In the case of saving the content to the external memory, since the saving is performed in a programmed operation, attention should be paid so as to ensure that the saving is performed at a timing where a data transfer from or to the external memory by other processings is not performed.

Next, operation of the nonmaskable interrupt will be specifically explained.

As seen from FIG. 5, since the NP flag is set just after the resetting, the nonmaskable interrupt request is neglected in this condition. The NP flag is cleared just before the resetting operation is completed, so that the nonmaskable interrupt request can be acknowledged.

If a nonmaskable interrupt request is generated in the course of execution of the main program, the microprocessor 100 acknowledges the interrupt request, and discontinues the execution of the main program.

As shown in FIG. 5, the following series of operations are sequentially performed: (1) the value of the PCEU 113 is saved to FEPC 136 for the restart of the discontinued main program; (2) the value of the PSW 131 is saved to the FEPSW 135; (3) "FFD0$_h$" is set to the FECC field of the ECR 132; (4) the NP flag is set to indicate that the nonmaskable interrupt processing is under execution; (5) the ID flag is set to prevent acknowledgement of a maskable interrupt request; and (6) the operation is branched to an address "FFFFFFD0$_h$" in order to execute an inherent interrupt processing program corresponding to the nonmaskable interrupt request (called an "mni proc" hereinafter).

In the interrupt processing program "mni proc", since the EP and ID flags are set, even if a maskable interrupt request is generated, it is neglected regardless of the level of the maskable interrupt request. Similarly, a further nonmaskable interrupt request is also neglected. In general, the nonmaskable interrupt request requires a processing having a high level of emergency, and therefore, it is unnecessary to support a multiple maskable/nonmaskable interrupt processing.

If the nonmaskable interrupt processing is generated just after the maskable interrupt request is acknowledged, the microprocessor performs the following multiple processing. Similarly to the above explanation, it is assumed that the maskable interrupt request of the level 10 has been acknowledged.

Even if the maskable interrupt request of the level 10 has been acknowledged, since the NP flag does not change from its just preceding value, the nonmaskable interrupt request is acknowledged if the NP flag is cleared. In order to save the current status, the EIPSW 133 and the EIPC 134 are used in the maskable interrupt and the FEPSW 135 and the FEPC 136 are used in the nonmaskable interrupt. Therefore, a special status saving for the maskable interrupt processing program to be discontinued is not necessary.

When the maskable interrupt request and the nonmaskable interrupt request are concurrently generated, the nonmaskable interrupt request is preferentially acknowledged by the MSEQ 211.

As mentioned above, according to the present invention, it is possible to provide a microprocessor capable of quickly and flexibly complying with a plurality of maskable interrupt requests, without requiring an external circuit. Therefore, it is possible to provide a microcomputer system having a high speed real time responsiveness for a plurality of maskable interrupt causes.

The invention has thus been shown and described with reference to the specific embodiments. However, it should be noted that the present invention is in no way limited to the details of the illustrated structures but changes and modifications may be made within the scope of the appended claims.

I claim:

1. An interrupt control system for use in a microprocessor configured to sequentially execute an instruction indicated by a program counter and to be able to process a plurality of interrupt requests, the interrupt control system including:

first receiving means for receiving an interrupt request signal from an external source, second receiving means for receiving from the external source a plurality of signal lines weighted to indicate a level of said interrupt request signal, status hold means having a group of flags which include a plurality of flags indicative of an interrupt allowing level and one flag indicating a predetermined status of an interrupt request, first save means for temporarily saving a content of said status hold means in its entirety in said microprocessor, second save means for temporarily saving a content of said program counter in said microprocessor, status indicating means for indicating that the interrupt request is acknowledged, comparison means for comparing the interrupt allowing level indicated by said group of flags, with said level received by said second receiving means so as to determine a large-and-small relation therebetween, and control means for controlling said status hold means, said first and second save means and said status indicating means, whereby when an interrupt request is supplied to said first receiving means, said control means processes said interrupt request supplied to said first receiving means, on a basis of a result of the large-and-small relation comparison by said comparison means and a content of said flag indicating a predetermined status of an interrupt request.

2. An interrupt control system claimed in claim 1 further including:

third receiving means for receiving a second interrupt request from an external source, third save means for temporarily saving a content of said status hold means in said microprocessor, and fourth save means for temporarily saving a content of said program counter in said microprocessor, so that when an interrupt request is supplied to said third receiving means, said control means controls so as to cause the contents of said status hold means and said program counter to be saved to said third and fourth save means, respectively.

3. An interrupt control system claimed in claim 2 further including means for storing a microprogram and means for decoding the microprogram stored in said storing means so that an instruction execution processing and an interrupt processing are executed under control of said microprogram.

* * * * *